Figure 1:
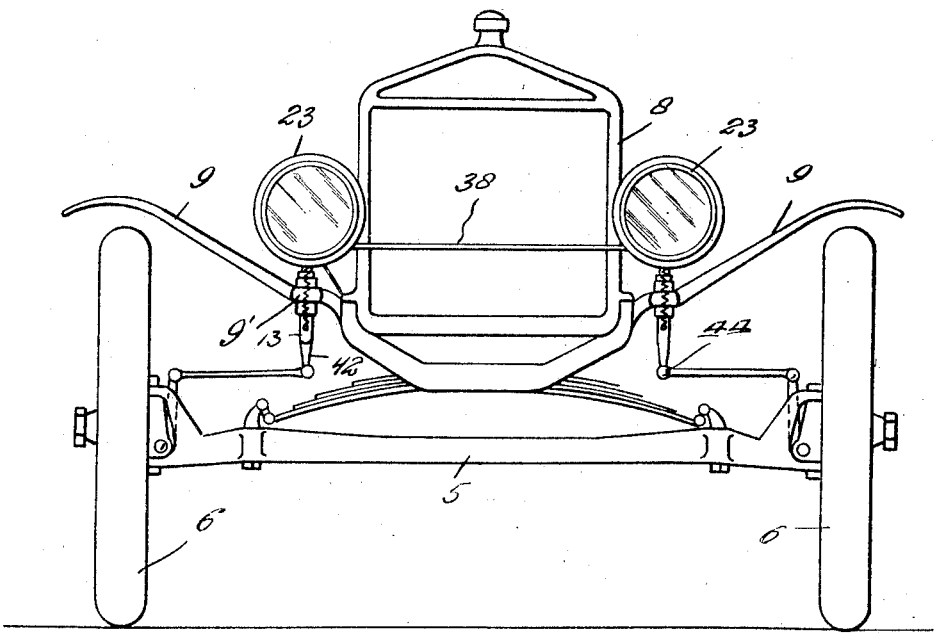

Nov. 18, 1924.  
J. T. CARTER ET AL  
1,515,655  
DIRIGIBLE HEADLIGHT CONSTRUCTION  
Filed July 31, 1923  
2 Sheets-Sheet 1

Witnesses:

J. T. Carter,
G. E. Watkins,
Inventor

Attorney

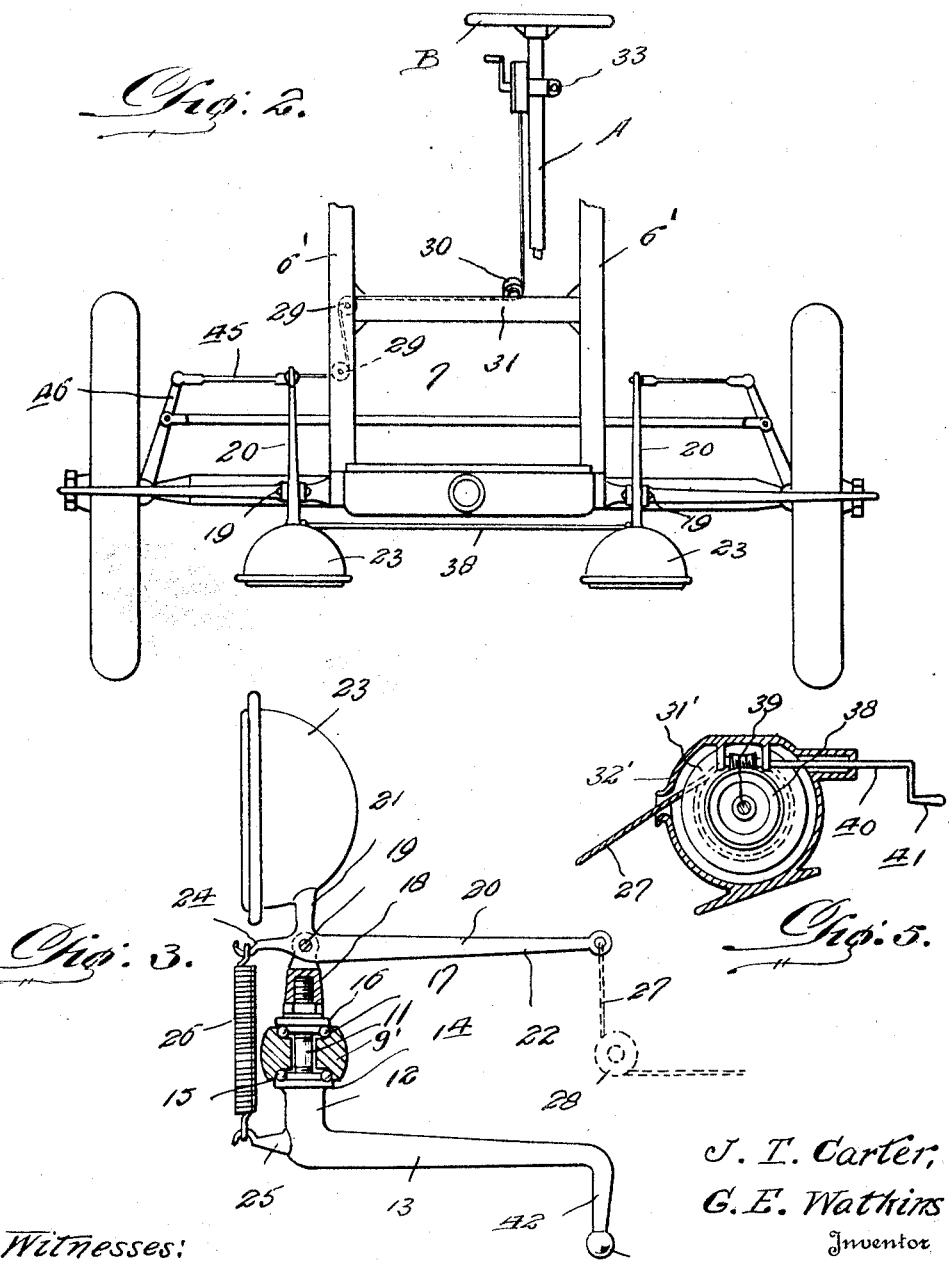

Patented Nov. 18, 1924.

1,515,655

UNITED STATES PATENT OFFICE.

JAMES T. CARTER AND GEORGE EVAN WATKINS, OF MILTON, OKLAHOMA.

DIRIGIBLE-HEADLIGHT CONSTRUCTION.

Application filed July 31, 1923. Serial No. 654,843.

*To all whom it may concern:*

Be it known that we, JAMES T. CARTER and GEORGE E. WATKINS, citizens of the United States, residing at Milton in the county of Le Flore and State of Oklahoma, have invented certain new and useful Improvements in Dirigible-Headlight Constructions, of which the following is a specification.

In carrying out the present invention, it is our purpose to provide an improved dirigible support for headlights, particularly adapted for the Ford type automobiles wherein the usual headlights are so mounted as to have a horizontal swinging movement in the direction of the steering movement of the front wheels thereof and this whenever said front wheels are moved to a steering position for thereby directing the light rays from the headlight in the path of travel of the vehicle for consequently illuminating curves in the road etc.

A further purpose of our invention is to provide a dirigible construction for headlights wherein the lamps are so mounted for horizontal swinging movement whereby said lamps are operatively connected to the steering mechanism of the vehicle for automatically turning in a horizontal plane each time the front steering wheels are similarly moved, the invention also including means for mounting the headlights wherein the same may be manually swung in a vertical direction for raising or lowering the headlight and consequently directing the light rays either upwardly or downwardly with respect to the longitudinal axis of the vehicle upon which they are mounted.

An additional purpose is to provide such a dirigible headlight construction that may be associated with vehicles of the above character in a simple, novel and expeditious manner, the nature of the same being such as to not interfere materially with the steering mechanism of the vehicle.

Other objects of the invention will be apparent as the nature of the same is better understood, the invention comprising the construction, combination and arrangement of parts set forth in the following specifications, shown in the accompanying drawings and claimed.

Figure 4:
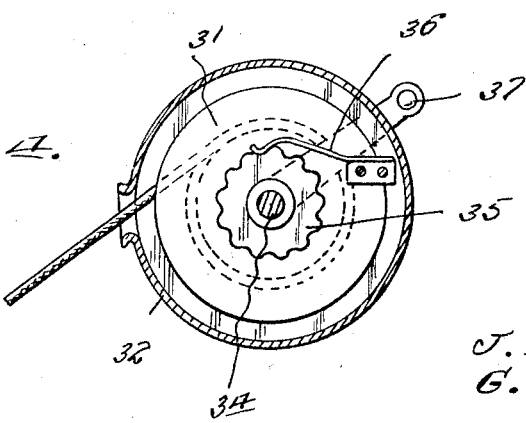

In the drawings wherein like reference characters indicate corresponding parts throughout Figures 1 to 4 inclusive, and wherein:

Figure 1 is a front elevational view of a Ford type automobile, part thereof being removed, equipped with our novel dirigible support for headlights, Figure 2 is a top plan view thereof, Figure 3 is an enlarged side elevational view partly in cross-section of one of the headlights, Figure 4 is an enlarged detail cross-section through the mechanism for controlling the vertical swinging movement of the pair of headlights, said mechanism being preferably disposed upon the steering column of the vehicle and directly beneath the steering wheel thereof, and Figure 5 is a similar view of a slightly modified form.

First having reference to Figures 1 to 3 inclusive, there is shown certain parts of the front end of a Ford type vehicle and in these Figures, 5 designates the front axle of the vehicle, 6 the usual steering wheels thereof, 8 the vehicle radiator, 9 the usual brace bars for the front fenders of the vehicle, 6' the chassis bars and 7 generally the steering mechanism of the vehicle.

In carrying out our invention the usual posts of the headlights are removed from the opening in the flat portions 9' of said fender braces 9 and positioned in these openings in lieu of said headlight posts are screw threaded posts 11 that are formed upon the ends of the upwardly extending portions 12 of the rearwardly directed arms 13, these upward extensions 12 being formed with ball racers 14 for the reception of ball bearings 15 that have close contact within the usual channels that encircle the lower side of said openings within the flat like portion 9' of the fender braces 9, Figure 3. Other ball racers 16 are screwed down upon said screw threaded posts 11 and between these racers and the usual channel encircling the upper ends of said openings within the flat like portions 9' of the fender braces 9 are ball bearings 17 wihch will co-operate with the bearings 15 for providing a bearing connection between said fender braces and said posts 11.

In screw threaded engagement with the extreme upper ends of said posts 11 are thimbles 18, the upper end of each being bifurcated for providing ears between which is pivotally mounted at 19 bell cranks 20 including a short vertical arm 21 and a relatively elongated rearwardly extending arm 22. Upon the upper end of each of the short arms 21 is a headlight 23 while between forwardly extending hook shaped elements 24 and 25 formed respectively upon the front ends of the said bell cranks 20 and the rearwardly directed arms 13 are retractile springs 26 that normally maintain the headlights 23—23 in the position shown in Figures 1 and 3.

Connected to either one of the arms 22 of the bell cranks 20 is one end of a cable 27 that extends downwardly and is passed over a pulley 28, this cable then extending rearwardly and laterally and being passed over pulleys 29 upon the adjacent chassis bars 6'. The cable is then extended laterally between said chassis bars 6'—6' and passed over a pulley 30 that is supported upon a cross bar 31 between said chassis bars, the cable then extending upwardly along side of the usual steering column A of the steering mechanism and being then attached to a drum 31' within a casing 32 that is clamped or otherwise suitably secured at 33 to said steering column directly beneath the steering wheel B.

Now, referring to Figure 4, it will be seen that said drum 31' is carried by a shaft 34 journaled at its ends within the side walls of the said casing 32, this shaft being equipped with a ratchet wheel 35 that rotates with said drum 31'. Secured at one end within this casing 32 is a spring arm 36, the front end of which is curved for contact with the periphery of said ratchet wheel 35 and serving as a means for maintaining said drum 31' in set positions. An operating handle 37 is provided for the drum, the rotation of this handle consequently rotating the drum 31' for either winding or unwinding the cable 27 thereupon, a winding of this cable upon the drum consequently causing the swinging movement of the headlights 23 in an upward direction for thereby directing the light rays upwardly with respect to the longitudinal axis of the vehicle. A rotation of the handle 37 in the opposite direction will unwind the cable therefrom and in view of the springs 26—26 the headlights 23 will again be brought to their initial position, Figure 3.

If desirable, a pair of cables may be provided, certain ends of each being attached to the relatively long arms 22 of the bell cranks 20 of said headlights 23—23. However, when a single cable is used a rod 38 is provided between the headlights 23—23 for thereby controlling the swinging movement of both simultaneously, when the cable is either wound or unwound from the drum 31'.

In Figure 5, the drum 31' within the casing 32' is equipped with a worm gear 38 that has mesh with a worm pinion 39 suitably journaled within the casing, this pinion being operatively connected to a shaft 40 that extends outwardly of said casing 32' and is formed with a handle 41, it being obvious that rotation of the shaft 40 in opposite direction will control the winding or unwinding of cable 27, this form of operating mechanism for the drum preventing rotation of the same unless manually operated.

Each of the before mentioned rearwardly directed arms 13 is equipped at its rear end with an inward extension 42 upon the end of which is a ball shaped head 43, each of these heads adapted for fitting within a socket 44 upon the inner ends of connecting rods 45 that are pivotally connected at their opposite ends to the ends of the usual arms 46, extending rearwardly from the steering knuckle of the vehicle's steering mechanism. It will therefore, be obvious that when the steering mechanism is actuated for moving the wheels 6—6 to a steering position, the headlights 23—23 will be swung in a similar direction for thereby directing the light rays in a direct path of travel of the vehicle.

Numerous advantages in a headlight of this description for vehicles of the present character will be at once apparent to those skilled in the art and even though we have herein set forth the most practical embodiment of the present invention it is nevertheless to be undersood that minor changes may be made within the invention without departing from the spirit and scope of the appended claim.

Having thus described our invention what we claim as new and desire to secure by Letters Patent is:—

A dirigible headlight support comprising a vertically disposed post, a lever fulcrumed upon the upper end of the post at a point between its ends, means for turning the post and swinging the lever simultaneously, an arm mounted upon the lever and disposed vertically above the point of pivotal connection between the lever and the post, a lamp carried by the arm, a spring connected at one end with the forward end of the lever, and connected at its other end with the lower portion of the post, and serving to hold the lamp at a normal position, a flexible cable connected with the rear end of the lever, pulleys journalled at fixed points below the rear end of the lever, said cable being trained under said pulleys, and cable winding means connected with the rear end of the cable adapted to be positioned upon a fixed support.

In testimony whereof we affix our signatures.

GEORGE EVAN WATKINS, M. D.
JAMES T. CARTER.